United States Patent
Zabriskie

[19]

[11] Patent Number: 5,912,955
[45] Date of Patent: Jun. 15, 1999

[54] METHOD AND APPARATUS FOR MANAGEMENT OF REMOTELY-DEPLOYED STATIONS

[75] Inventor: Kenneth Andrew Zabriskie, Indianapolis, Ind.

[73] Assignee: AT&T Corp, Middletown, N.J.

[21] Appl. No.: 08/846,811

[22] Filed: Apr. 30, 1997

[51] Int. Cl.$^6$ .......................... H04M 15/00; H04M 17/00
[52] U.S. Cl. .......................... 379/132; 379/147; 379/146; 379/155; 379/140
[58] Field of Search .................................... 379/130, 131, 379/132, 140, 141, 111, 112, 113, 143, 146, 147, 148, 149, 150, 155, 154; 705/1, 39; 194/215, 216, 217

[56] References Cited

U.S. PATENT DOCUMENTS

| | | |
|---|---|---|
| 4,122,308 | 10/1978 | Weinberger et al. |
| 4,736,444 | 4/1988 | Dhein ........................................ 379/147 |
| 5,410,590 | 4/1995 | Blood et al. ............................. 379/147 |

*Primary Examiner*—Paul Loomis

[57] ABSTRACT

Methods and systems are disclosed for the management of a remotely-deployed unit such as, for example, a telephone station. A local station revenue signal generated at the remote station corresponds to an amount of revenue generated at the remote unit. The generated revenue signal is processed with a generated cost signal, which corresponds to an amount of cost incurred in supporting the station, whereby the profitability of the station can be determined in an automated and/or real time or near real-time manner, and overall management of the unit becomes more efficient and effective. Also disclosed are methods and apparatus for managing a remotely-deployed station wherein at least one local end usage signal is generated, which corresponds to a total amount of usage, such as direct-dial or commission-related telephone line usage for example, measured locally during a given time period. The at least one local end usage signal is compared against at least one remote usage signal, which corresponds for example to a total amount of telephone line usage measured remotely during the given time period. The result of the comparison is available to direct a management function related to the remote station in an efficient manner.

41 Claims, 5 Drawing Sheets

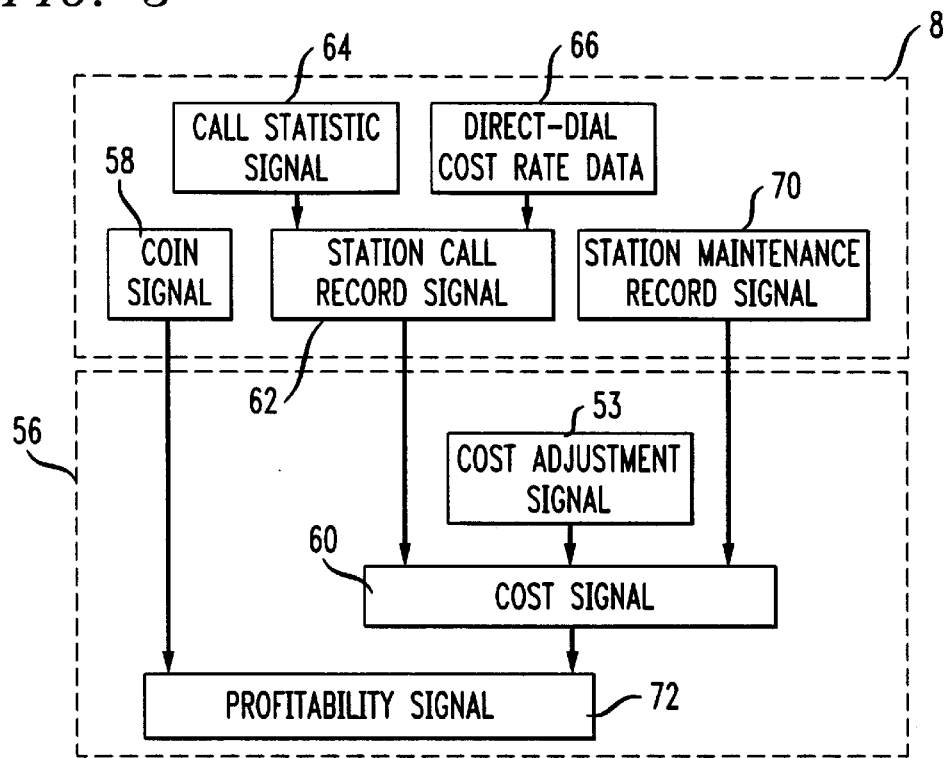

METHOD AND APPARATUS FOR MANAGEMENT OF REMOTELY-DEPLOYED STATIONS

BACKGROUND OF THE INVENTION

The present invention relates to revenue-generating and/or cost-incurring units or stations, and, more particularly, methods and apparatus useful in the management of remotely-deployed units or stations such as telephone stations for example.

The vast majority of telephone network systems currently in use employ a plurality of passive telephone stations that connect to a central network operations platform. The telephone stations in such network systems are often referred to as "dumb" telephones, insofar as such telephones traditionally are not equipped to independently monitor the revenue and/or costs associated with telephone calls placed from the station. Rather, all such monitoring occurs on the exchange level, independent of the telephone station itself.

However, certain systems have been developed to monitor telephone calls from the calling location, and to provide information at the calling location as to the cost of telephone calls placed from the location. Weinberger et al., U.S. Pat. No. 4,122,308, for example, discloses a telephone accessory device for monitoring the cost of a telephone call at the location of the calling telephone. The cost of each call is determined by address to a memory that contains billing rate information. At the conclusion of the telephone call, the device enters the total cost of the call into an accumulator which provides information as to the total month-to-date costs of calls placed from the telephone.

It is nevertheless highly desirable to more effectively manage remotely-deployed units such as telephone stations in an automated and/or real or near real-time fashion, including to minimize the delays and expenses associated with manual gathering and use of management data. Such management control over such stations may enable and include, for example, tracking of telephone station revenue and expenses to assess the profitability of telephone stations, reconciliation of billed charges associated with the telephone line, and/or reconciliation of commissions related to services associated with the telephone line.

Accordingly, it is an object of the present invention to provide systems for more effective and comprehensive management of remotely-deployed, revenue-generating and/or cost-incurring units or stations, such as telephone stations for example, including methods and apparatus that provide for revenue and expense tracking, maintenance tracking, profitability assessment, billing reconciliation and/or commission reconciliation in an automated and/or real or near real-time manner. It thereby is an object of the present invention to reduce delays, effort and expenses heretofore incurred in managing such remote stations, and to in turn increase management efficiency. Other objects of the present invention will be apparent to those of ordinary skill in the art from the drawing and the following description.

SUMMARY OF THE INVENTION

Preferred methods and systems of the present invention are directed to the management of and the profitability assessment of a remotely-deployed unit such as, for example, a telephone station on a telephone line having a local end at which telephone calls are placed using the telephone station. A local station revenue signal generated at a unit or telephone station corresponds to an amount of telephone call revenue generated at the telephone station. The generated revenue signal can be processed with a generated cost signal, which may correspond to an amount of incurred cost related to the telephone line, whereby the profitability of the telephone station is determined. Real-time or near real-time cost and revenue information related to the telephone station and/or line may be used to more efficiently and effectively manage the station and/or line.

Also disclosed are preferred systems and methods for managing at least one telephone line having a local end at which telephone calls are placed. The preferred system includes an accumulator that generates at least one local end usage signal, which corresponds to a total amount of usage, such as direct-dial or commission-related telephone line usage for example, measured at the local end of the telephone line during a given time period. The system further comprises a comparitor that compares the at least one local end usage signal against at least one remote usage signal, which corresponds to a total amount of telephone line usage measured remote from the local end of said telephone line during the given time period. The comparitor produces at least one comparison signal that corresponds to a result of the comparison. The result is, in turn, available by virtue of the comparison signal to direct a management function related to the telephone line.

Similarly, the preferred method contemplates the generation of at least one local end usage signal, which corresponds to a total amount of direct-dial or commission-related telephone line usage measured at the local end of the telephone line during a given time period. The preferred method further contemplates a comparison of the at least one local end usage signal against at least one remote usage signal, which corresponds to a total amount of telephone line usage measured remote from the local end of said telephone line during the given time period. A comparison signal is thereby generated, the signal corresponding to a result of the comparison. Again, the result is, in turn, available by virtue of the comparison signal to direct a management function related to the telephone line.

The present invention provides methods and systems for more effective and comprehensive management of a remotely-deployed unit or station such as a telephone station in an automated and/or real-time or near real-time manner, thereby minimizing or eliminating delays associated with manual gathering of management data. Further advantages and features of the present invention will be apparent to those of ordinary skill in the art in view of the drawing and the detailed description which follows.

BRIEF DESCRIPTION OF THE DRAWING

Preferred embodiments of the present invention are described herein with reference to the drawing wherein:

FIG. 3 is a schematic flow chart diagram of an embodiment in accordance with the present invention for assessing the profitability of a telephone station through which direct-dialed telephone calls are placed;

FIG. 4 is a schematic flow chart diagram of an embodiment in accordance with the present invention for assessing the profitability of a telephone station through which operator service telephone calls are placed;

DESCRIPTION OF THE PREFERRED EMBODIMENT

Figure 1:
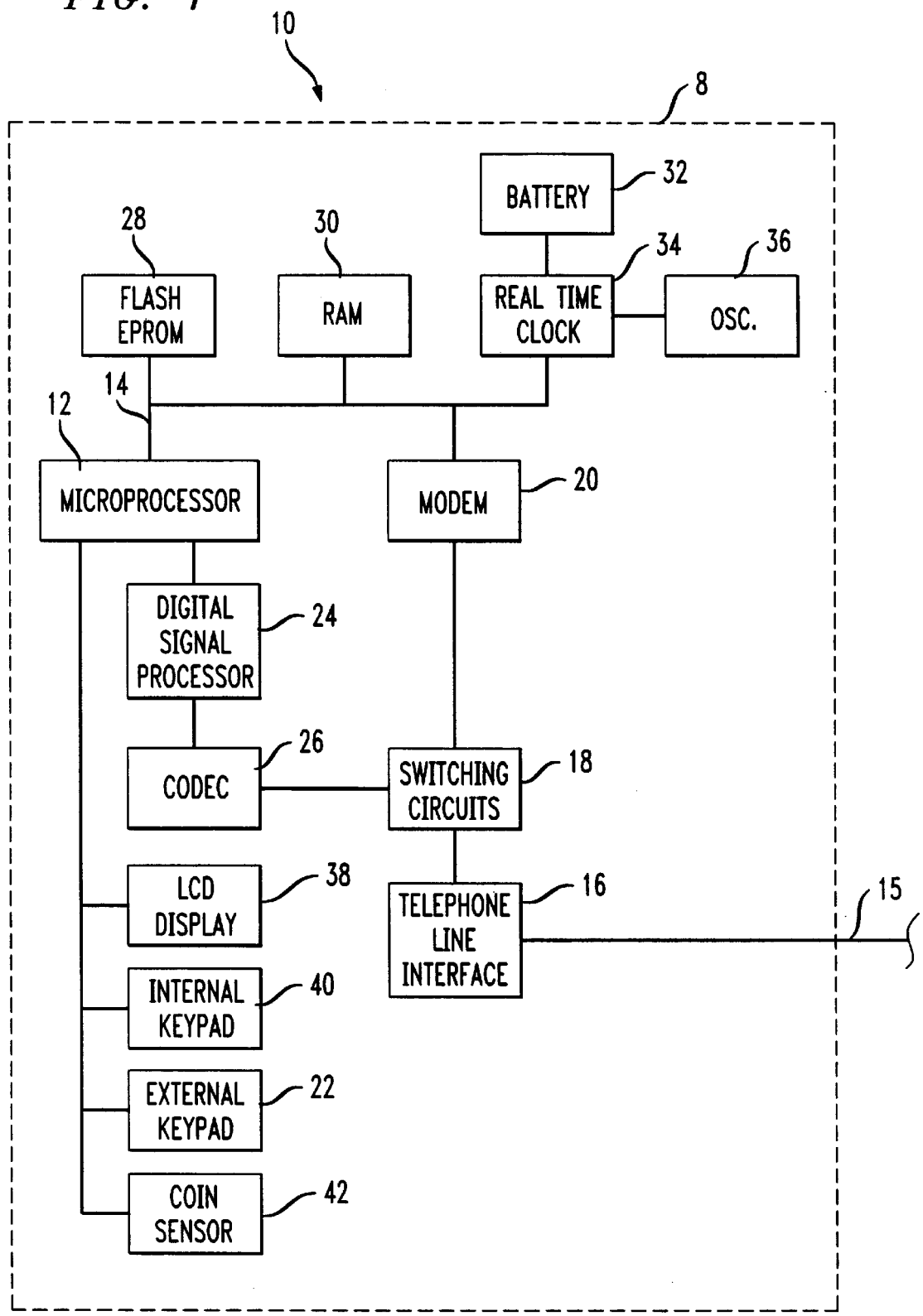
FIG. 1 is a schematic block diagram of preferred hardware components that are included in a remotely-deployed telephone station in accordance with one embodiment of the present invention.

Preferred methods and apparatus of the present invention are set forth in FIGS. 1–7. FIG. 1, for example, shows a schematic block diagram of preferred hardware components that may be included in a remotely-deployed telephone station 8 to assist in carrying out the preferred methods described herein.

Specifically, the preferred telephone station 8 includes a microprocessor-based subsystem 10 having a microprocessor 12 and an address and data bus 14 to provide for the internal communication between the various subsystem components. The subsystem 10 communicates with a telephone line 15 through a telephone line interface 16 and appropriate switching circuitry 18. A modem 20 is also provided to allow for the preferred bilateral transfer on the telephone line of information described below between the telephone station and a remote location. An external keypad 22 provides means for entry by the consumer of a telephone number to be called, as well as any other coded tones that are desired. A digital signal processor 24 and a CODEC 26 cooperate to provide for accurate detection of a telephone call connection, or answer. A flash EPROM 28 provides for non-volatile memory storage for the subsystem, including for example storage of statistics related to individual telephone calls. Such statistics may include for example the called telephone number, the call start time, the call end time, and other appropriate accounting information. The flash EPROM 28 may also be used to store maintenance records, for example, related to the operation and/or maintenance history of the telephone station. A RAM device 30 is also provided for additional memory support, if required. A subsystem consisting of a battery 32, a real-time clock 34, and a 32.768 KHz oscillator 36 provides for accurate timing and time stamping of telephone calls. An LCD display device 38 and an internal keypad 40 provide for entry of electronic maintenance information related to the operation and/or repair history of the telephone station. The LCD display device 38 may, if desired, be configured to display other information stored in or otherwise handled or processed by the subsystem. A coin sensor 42 preferably cooperates with the coin chute of the telephone station to provide an indication as to the amount of currency revenue received by the telephone station.

The preferred telephone station employs the foregoing components to monitor telephone call statistics and to store, receive from and/or transfer to a remote location various data relating to the operation of the telephone station. These features help provide for increased flexibility and effectiveness in the management of remotely-deployed telephone stations associated with the network.

Figure 2:
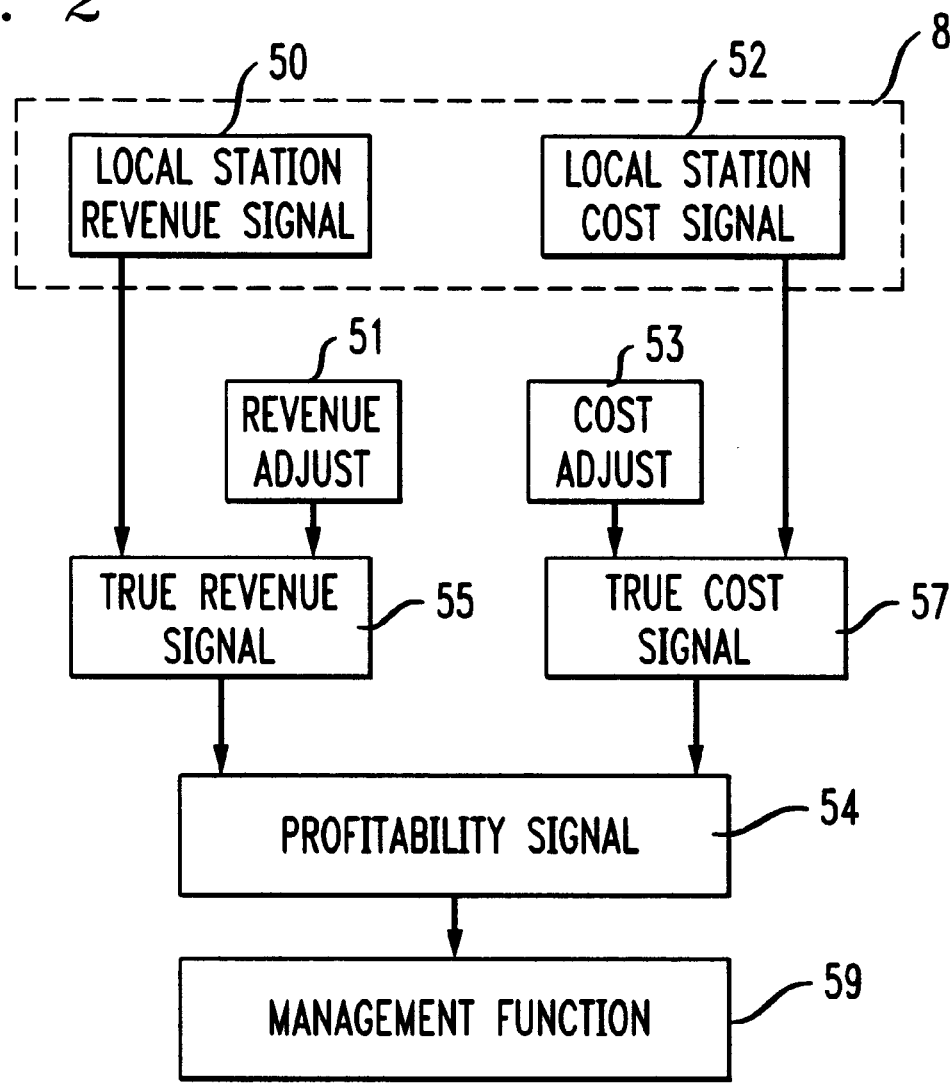
FIG. 2 is a schematic flow chart diagram of an embodiment in accordance with the present invention for assessing the profitability of a telephone station on a telephone line.

FIG. 2, for example, is a schematic flow chart diagram that helps illustrate a preferred method for managing, including assessing the profitability of, a telephone station on a telephone line. The telephone line has a local end at which telephone calls are placed using the telephone station. At step 50, the telephone station generates a local station revenue signal that corresponds in one or more of a variety of different ways, as described below for example, to an amount of telephone call revenue that is generated at the telephone station. This local station revenue signal is processed using steps 51 and 55 to provide a true revenue signal, preferably corresponding to the total adjusted revenue attributable to the station for the specified period.

A cost signal is generated at step 52 and corresponds in one or more of a variety of different ways as described below for example to an amount of incurred cost related to the telephone line. The cost signal may originate in whole or in part from data provided by the telephone station, or alternatively may be provided independent of the telephone station. This cost signal, or local station cost signal, is processed using steps 53 and 57 to provide a true cost signal, preferably corresponding to the total adjusted cost attributable to the station for the specified period.

The true revenue signal and the true cost signal are processed in step 54 to generate a profitability signal related to the profitability of the telephone station. Such processing can occur either at the station 8 or, more preferably, at a location remote from the station. The profitability signal may then be used, in turn, to direct a management function in step 59 related to said telephone line based upon, for example, accumulated and tabulated information relating to the profitability of one or more telephone stations associated with a particular network.

FIG. 3 is a schematic flow chart diagram that provides an illustrative example of a method for assessing a profitability of a telephone station through which direct-dialed telephone calls are placed. In this embodiment, the local station revenue signal generated by the telephone station 8 comprises a coin signal that corresponds to coin collections received by the telephone station 8 over a predetermined period of time, as provided in step 58 using the coin sensor 42. The coin signal can be processed within the telephone station 8 or alternatively, for example, transmitted on the telephone line 15 from the telephone station 8 to a remote location for further, external processing. Such external processing may occur on the operations support platform 56, for example.

A cost signal is preferably generated in this particular embodiment in step 60 using at least one station call record signal, a cost adjustment signal, and a station maintenance record signal. In this way, the cost signal in this embodiment relates to the overall expenses associated with operation of the telephone station 8 during the time period of interest.

In particular, the at least one station call record signal that is provided in step 62 preferably relates to data that is maintained at the telephone station 8, and which is transmitted on the telephone line 15 from the telephone station 8 to a remote location for further, external processing. A station call record signal may, for example, comprise one or more call statistic signals from step 64 that represent raw statistics associated with telephone calls placed at the telephone station during the pertinent time period, such as for example the called telephone number, the call start time, the call end time, and/or the call duration. This raw statistical data can be transmitted and processed at a remote location with cost rate data that, for example, may identify the direct-dialed cost rate for all destination telephone numbers placed from the station. A call cost signal thereby may be derived representing incremental incurred costs of telephone calls placed at the telephone station 8. Alternatively, such cost rate data is preferably downloaded and maintained at the telephone station 8 such that the cost rate data may be used in step 66 on a local station level, whereby the at least one station call record signal provided by the telephone station 8 in step 62 includes more cost-specific call information, such as for example the incremental metered or measured cost of telephone calls placed from the telephone station 8, as determined at the location of the telephone station 8.

The preferred cost adjustment signal is provided in step 68 at the operations or other remote level, and represents one or more fixed costs associated with the telephone station 8 and/or telephone line 15 during the pertinent time period. Example fixed costs that may be represented by the preferred cost adjustment signal include fixed line charges, discounts, fees and other similar adjustments that traditionally constitute expenses associated with a telephone station and/or telephone line.

The preferred station maintenance record signal represented in step 70 relates to data that is input into the telephone station by a telephone maintenance technician regarding the operation and/or maintenance history of the station 8 and/or line 15 during the time period of interest. Such data may be inputted to and maintained by the telephone station 8 as coded information relating to predefined operating problems or maintenance projects. This maintenance record signal can be processed at the station level, or transmitted over the telephone line 15 to a remote location for external processing.

The coin signal and the cost signal are thereafter processed in step 72 to generate a profitability signal related to the profitability of the telephone station 8 during the time period of interest.

FIG. 4 is a schematic flow chart diagram that provides another illustrative example of the methods of the present invention. This particular embodiment relates to a method for assessing a profitability of a telephone station through which operator service, or "O+", telephone calls are placed. In this embodiment, the local station revenue signal provided by the telephone station 8 is preferably generated at least in part using at least one station call record signal. Similar to that which is described above in connection with direct-dialed telephone calls, the at least one station call record signal that is provided in step 76 preferably relates to data that is accumulated over a predetermined time period and maintained at the telephone station 8. Such accumulated data may then be transmitted on the telephone line 15 from the telephone station 8 to a remote location for further, external processing. A station call record signal may, for example, comprise one or more call statistic signals from step 78 that represent raw statistics associated with telephone calls placed at the telephone station, such as for example the called telephone number, the call start time, the call end time, and/or the call duration. This raw statistical data can be transmitted and processed at a remote location with value data that, for example, may identify for all destination telephone numbers placed from the station the associated incremental operator service charge. A call value signal thereby may be derived representing incremental operator service charges for operator service telephone calls placed at the telephone station 8 during the period of interest. Revenue adjustment data, relating to commissions to be paid or commissions to be received with respect to placed operator service telephone calls, may also be processed. In the preferred embodiment, value data is downloaded and maintained at the telephone station 8 such that the information may be used in step 80 on a local station level, whereby the at least one station call record signal provided by the telephone station 8 in step 76 includes more value-specific call information. Revenue adjustment data, if any, from step 81 is preferably maintained remote from the telephone station 8, and is available to provide any necessary adjustments to information received from the telephone station 8 so as to ensure that the profitability signal of step 88 accurately accounts for the true revenue attributable to the station 8 for the subject period.

A cost signal is preferably generated in this particular embodiment in step 82 using a cost adjustment signal and a station maintenance record signal. Although it is not contemplated in the diagram shown in FIG. 4, the revenue adjustment data described above may also be used to generate the cost signal where, for example, commissions to be paid constitute additional expense associated with the telephone station 8 and/or line 15. Referring again to FIG. 4, the preferred cost adjustment signal is provided in step 84 at the operations or other remote level, and again represents one or more fixed costs associated with the telephone station 8 and/or telephone line 15 during the pertinent time period. Similar to that which is described above in connection with direct-dialed telephone calls, the preferred station maintenance record signal represented in step 86 for this embodiment relates to data that is input into the telephone station by a telephone maintenance technician regarding the operation and/or maintenance history of the station 8 and/or line 15 during the relevant time period.

The station call record signal and the cost signal are thereafter processed in step 88 to generate a profitability signal related to the profitability of the telephone station 8 during the period of interest.

Figure 5:
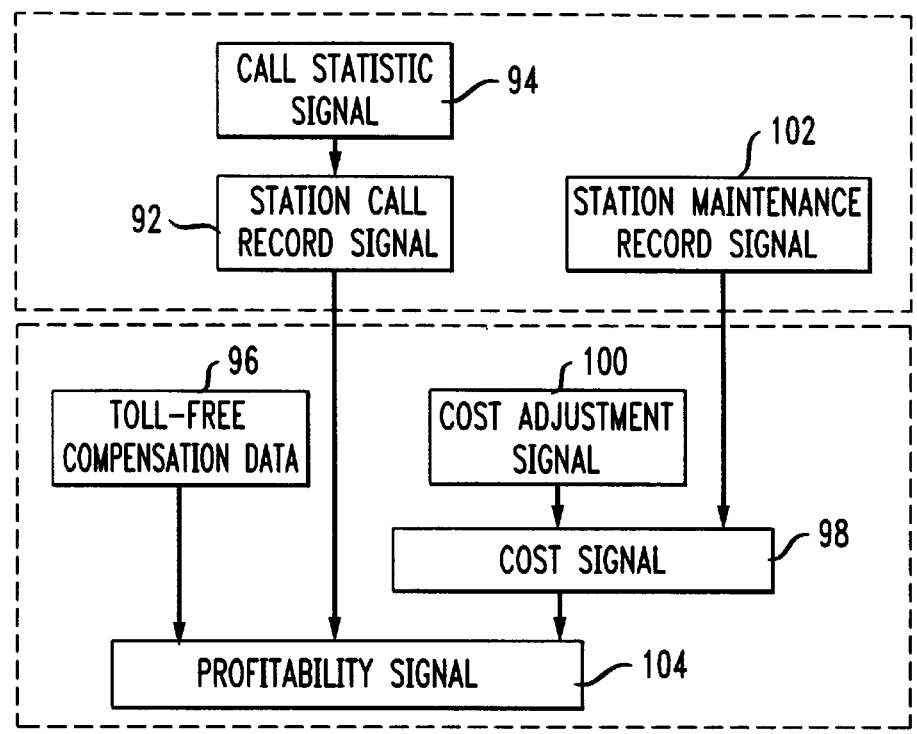
FIG. 5 is a schematic flow chart diagram of an embodiment in accordance with the present invention for assessing the profitability of a telephone station through which toll-free telephone calls are placed.

FIG. 5 is a schematic flow chart diagram that provides yet another illustrative example of the methods of the present invention. This particular embodiment relates to a method for assessing a profitability of a telephone station through which toll-free telephone calls are placed. The local station revenue signal provided by the telephone station 8 in this embodiment is again preferably generated at least in part using at least one station call record signal. The at least one station call record signal that is provided in step 92 preferably relates to data that is accumulated over a predetermined time period and maintained at the telephone station 8. Such accumulated data may then be transmitted on the telephone line 15 from the telephone station 8 to a remote location for further, external processing.

A given station call record signal may comprise one or more call statistic signals from step 94, which in this embodiment preferably represent simply the called telephone number. Additional and/or other statistics could be instead maintained. This statistic data is preferably transmitted from said telephone station 8 and processed remote from said station 8 with compensation data that, for example, may identify for all destination toll-free telephone numbers placed from the station 8 the associated flat toll-free fee that is due to the station owner for the call. Compensation data from step 96 is preferably maintained in this regard remote from the telephone station 8, and is processed in combination with call signals from said station 8 to provide information regarding the true revenue attributable to the telephone station 8. It will be understood, however, that the compensation data alternatively could be downloaded and maintained at the telephone station 8, such that the at least one station call record signal that is provided by the telephone station 8 in step 92 includes more revenuespecific call information. It will also be understood that compensation data alternatively may be processed as a part of step 98 insofar as such compensation constitutes an expense in the operation of the station 8 during the period of interest.

A cost signal is preferably generated in this particular embodiment in step 98 using a cost adjustment signal and a station maintenance record signal. The preferred cost adjustment signal is provided in step 100 at the operations or other remote level, and again represents one or more fixed costs associated with the telephone station 8 and/or telephone line 15 during the pertinent time period. Similar to that which is described above in connection with direct-dialed and O+telephone calls, the preferred station maintenance record signal represented in step 102 for this embodiment relates to data that is input into the telephone station by a telephone maintenance technician regarding the operation and/or maintenance history of the station 8 and/or line 15 during the relevant time period.

The station call record signal and the cost signal are thereafter processed in step 104 to generate a profitability signal related to the profitability of the telephone station 8 during the period of interest.

Figure 6:
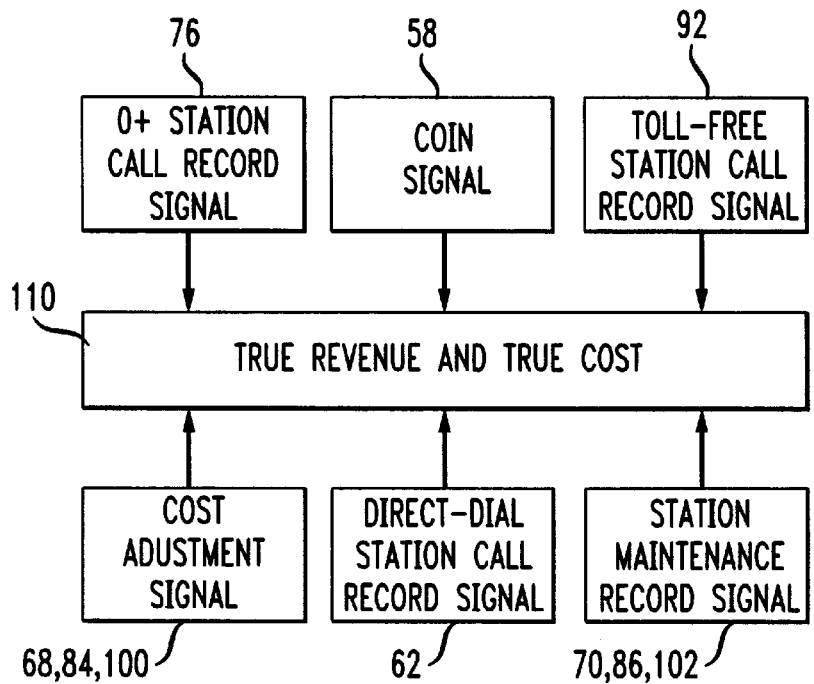
FIG. 6 is a schematic flow chart diagram of an embodiment in accordance with the present invention for assessing the profitability of a telephone station through which direct-dialed, operator service, and toll-free telephone calls are placed, incorporating the embodiments of FIGS. 3–5.

FIG. 6 is another schematic flow chart diagram to illustrate that the preferred apparatus and method of the present invention contemplates assessment in step 110 of direct-dialed telephone calls, operator service telephone calls, and toll-free telephone calls for a given telephone station. It shall be understood, however, that fewer than all three types of telephone calls can be assessed without departing from the true spirit and scope of the invention.

The preferred hardware shown in FIG. 1 may be used in further managing a telephone station 8 or a telephone line 15 having a local end at which direct-dialed, operator service and/or toll-free telephone calls for example are placed. The telephone station may be a coin-operated set linked to a conventional telephone network, as shown for example by FIG. 1, or may be an alternative type of phone system such as a PBX telephone network, for example.

Figure 7:
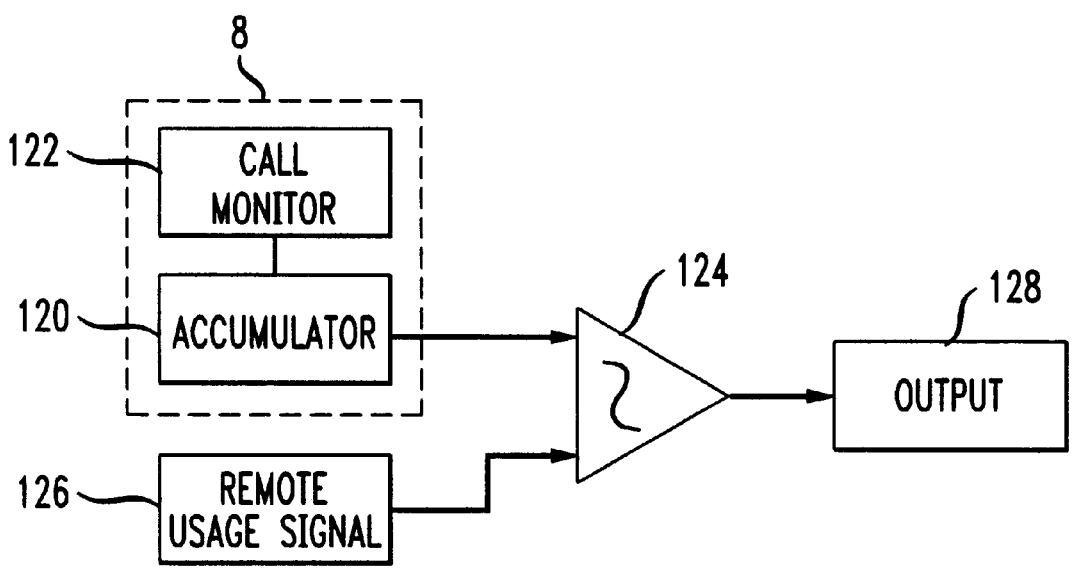
FIG. 7 is a schematic block diagram of an embodiment in accordance with the present invention for managing at least one telephone line having a local end at which commission or other revenue-generating telephone calls are placed.

FIG. 7 illustrates an example embodiment of this aspect of the present invention. In particular, the telephone station 8 is a coin-operated set that includes an accumulator 120 which generates at least one local end usage signal that corresponds to a total amount of direct-dial telephone line usage measured by the telephone station 8 during a given time period. A plurality of local end usage signals may be generated, if desired, wherein each such local end usage signal corresponds to a total amount of direct-dial telephone line usage attributable to a particular service carrier. With reference to FIGS. 1 and 7, the preferred accumulator 120 comprises the microprocessor 12, the flash EPROM 28, the RAM 30, and the appropriate firmware and/or software to control these hardware components.

The preferred embodiment also includes a call monitor 122 located at the telephone station 8 that generates at least one individual call signal for each direct-dialed telephone call placed from the telephone station 8. The at least one individual call signal corresponds to an amount of line usage for the direct-dialed telephone call as measured at the telephone set 8. The preferred call monitor 122 comprises the DSP 24, the CODEC 26, the real time clock 34, the battery 32, the oscillator 36, and the appropriate firmware and/or software to control these hardware components. The individual call signal generated by the call monitor 122 is used by the accumulator 120 to generate the at least one local end usage signal.

The at least one local end usage signal generated by the accumulator 120 is provided to the input of a comparitor 124, which is preferably located remote from the telephone station 8, such as at the operations support platform for example. The at least one local end usage signal may be transmitted from the accumulator 120 to the comparitor 124 over the telephone line 15 using the modem 20.

Also input to the comparitor 124 is at least one remote usage signal 126 that corresponds to a total amount of direct-dial telephone line usage measured remote from said local end of said telephone line during the time period of interest. The comparitor 124 thus compares the input signals, preferably for determining the degree of consistency between the independent measures of direct-dial telephone line usage. Such comparison could involve a call-by-call record analysis, for example, or instead could involve an analysis of summary signals such as those representing the final overall charge incurred as a result of the direct-dial telephone line usage. In the latter example, signals representing fixed line charges and other anticipated expenses could be combined with the at least one local usage signal to provide an accurate comparison.

The comparitor 124 produces at least one comparison signal at output 128 that corresponds to a result of the comparison. The result may indicate, for example, whether there are any inconsistencies in terms of telephone usage as measured at the telephone station 8 using the call monitor 122 and accumulator 120 (on behalf of the phone owner) and telephone usage as measured at a location remote from the station 8 (by the local exchange and/or inter-exchange carriers, for example).

The comparison signal may thereby be used to direct a management function related to said telephone line, such as for example automated billing reconciliation on behalf of the phone owner. An comparison signal or output 128 can be used to identify the point(s) and/or degree of inconsistency discerned as a result of the comparison, or rather can be used simply to indicate that the billed charges should be reviewed in detail for accuracy. If, on the other hand, there is no inconsistency discerned by the comparison, or if the degree of inconsistency falls within an acceptable tolerance range, then the output 128 may be used, for example, to provide an appropriate indication of the comparison result or further to facilitate payment of the billed charges by triggering issuance of payment, electronic or otherwise, in the appropriate amount.

While the comparitor 124 is preferably external to the telephone station 8, it alternatively could be incorporated into the telephone station 8. In this alternative embodiment, the remote usage signal can be received by the telephone set from the telephone line using the modem 20. Alternative functions could be undertaken by the telephone set 8 in response to the comparison signal, such as for example facilitating payment of the billed charges by triggering issuance of payment.

Similarly, accumulator 120 could additionally or alternatively generate at least one local end usage signal that corresponds to an amount of commission-related telephone line usage measured by the telephone station 8 during a given time period. Each of a plurality of local end usage signals may correspond to a total amount of commission-related telephone line usage attributable to a particular type of service and/or service carrier. In this context, call monitor 122 preferably generates at least one individual call signal for each commission-related telephone call placed from the telephone station 8. The at least one individual call signal corresponds to the line usage as measured at the telephone set 8, whether measured in terms of amount of call connect time, number of call occurrences, commission fee amount or otherwise. The individual call signal generated by the call monitor 122 is used by the accumulator 120 to generate the at least one local end usage signal.

The at least one local end usage signal generated by the accumulator 120 is provided to the input of comparitor 124. Again, the at least one local end usage signal may be transmitted from the accumulator 120 to the comparitor 124 over the telephone line 15 using the modem 20. At least one remote usage signal 126 is also input into the comparitor 124, the remote usage signal 126 now corresponding to an amount of commission-related telephone line usage measured remote from said local end of said telephone line during the time period of interest. Preferably the input signals to the comparitor 134 are consistent with one another as to units of measure, whether the usage is expressed in terms of amount of call connect time, by call occurrence, by measured commission fee amount, or otherwise. The comparitor 124 thus compares the input signals for consistency, and produces at least one comparison signal at output 128. The result of the comparison may thereby be used to direct a management function related to said telephone line similar to those functions described earlier, such as for example automated reconciliation of commission fees owed by and/or due to the station owner.

Indeed, although certain embodiments of the invention have been described and illustrated herein, it will be readily apparent to those of ordinary skill in the art that a number of modifications and substitutions can be made to the methods and apparatus disclosed and described herein without departing from the true spirit and scope of the invention.

We claim:

1. A method for assessing a profitability of a telephone station on a telephone line having a local end at which telephone calls are placed using said telephone station, comprising the steps of:

generating at said telephone station a local station revenue signal corresponding to an amount of telephone call revenue generated at said telephone station;

generating a cost signal corresponding to an amount of incurred cost related to said telephone line; and processing said revenue and cost signals, whereby said profitability of said telephone station is determined.

2. A method as set forth in claim 1, wherein said local station revenue signal comprises a coin signal corresponding to coin collections received by said telephone station.

3. A method as set forth in claim 1, wherein said cost signal is generated at least in part using at least one station call record signal that is provided by said telephone station.

4. A method as set forth in claim 1, wherein said cost signal is generated at least in part using at least one cost adjustment signal.

5. A method as set forth in claim 4, wherein said at least one cost adjustment signal corresponds to at least one fixed cost associated with said telephone line.

6. A method as set forth in claim 4, wherein said cost signal is generated at least in part using at least one station maintenance record signal that is provided by said telephone station.

7. A method as set forth in claim 1, wherein said local station revenue signal comprises a coin signal corresponding to coin collections received by said telephone station, wherein said cost signal is generated at least in part using at least one station call record signal that is provided by said telephone station, and wherein said cost signal is also generated at least in part using a station maintenance record signal that is provided by said telephone station and at least one cost adjustment signal corresponding to at least one fixed cost associated with said telephone line.

8. A method as set forth in claim 3, wherein said at least one station call record signal comprises at least one call statistic signal corresponding to statistics associated with telephone calls placed at said telephone station.

9. A method as set forth in claim 3, wherein said at least one station call record signal comprises at least one call cost signal corresponding to incurred costs of telephone calls placed at said telephone station as determined by said telephone station using call statistic data and call rate data maintained by said telephone station.

10. A method as set forth in claim 1, wherein said revenue signal and cost signal are processed at a location remote from said local end of said telephone line.

11. A method as set forth in claim 1, wherein said local station revenue signal is generated at least in part using at least one station call record signal that is provided by said telephone station.

12. A method as set forth in claim 1, wherein said at least one cost signal is generated at least in part using at least one cost adjustment signal.

13. A method as set forth in claim 4, wherein said at least one cost adjustment signal corresponds to at least one commission charge associated with said telephone line.

14. A method as set forth in claim 4, wherein said cost signal is generated using at least one station maintenance record signal that is provided by said telephone station.

15. A method as set forth in claim 1, wherein said local station data signal is generated at least in part using at least one station call record signal that is provided by said telephone station, wherein said cost signal is generated at least in part using at least one cost adjustment signal corresponding to at least one commission charge associated with said telephone line and a station maintenance record signal that is provided by said telephone station.

16. A method as set forth in claim 11, wherein said at least one station call record signal comprises at least one call statistic signal corresponding to statistics associated with telephone calls placed at said telephone station.

17. A method as set forth in claim 11, wherein said at least one station call record signal comprises at least one call value signal corresponding to incurred value of telephone calls placed at said telephone station as determined by said telephone station using call statistic data and call value data maintained by said telephone station.

18. A system for managing at least one telephone line having a local end at which telephone calls are placed, comprising:

an accumulator that generates at least one local end usage signal that corresponds to a total amount of telephone line usage measured at said local end of said telephone line during a given time period; and a comparitor that compares said at least one local end usage signal against at least one remote usage signal that corresponds to a total amount of telephone line usage measured remote from said local end of said telephone line during said given time period, said comparitor producing at least one comparison signal corresponding to a result of said comparison, whereby said result is available through said comparison signal to direct a management function related to said telephone line.

19. A system as set forth in claim 18, further comprising a call monitor at said local end of said telephone line that generates at least one individual call signal for each telephone call placed from said local end of said telephone line, said at least one individual call signal corresponding to an amount of line usage for said telephone call as measured at said local end of said telephone line, and said individual call signal being used by said accumulator to generate said at least one local end usage signal.

20. A system as set forth in claim 18, further comprising a telephone set coupled to said local end of said telephone line, said telephone set housing said accumulator and said comparitor.

21. A system as set forth in claim 20, further comprising a display device on said telephone set that provides a visual indication of said result of said comparison as determined by reference to said at least one comparison signal.

22. A system as set forth in claim 20, wherein said at least one remote usage signal is received from said telephone line at said telephone set.

23. A system as set forth in claim 18, wherein said accumulator is located at said local end of said telephone line and said comparitor is located remote from said local end of said telephone line, and wherein said at least one local end usage signal is transmitted from said accumulator to said comparitor over said telephone line.

24. A system as set forth in claim 23, further comprising a telephone set coupled to said local end of said telephone line, said telephone set housing said accumulator.

25. A system as set forth in claim 24, further comprising a display device on said telephone set that provides a visual indication of said result of said comparison as determined by reference to said at least one comparison signal.

26. A system as set forth in claim 18, wherein each of a plurality of local end usage signals corresponds to a total amount of direct-dial telephone line usage attributable to a particular service carrier.

27. A system as set forth in claim 18, wherein said telephone calls are direct-dialed telephone calls placed through a coin-operated telephone system.

28. A system as set forth in claim 18, wherein said telephone calls are placed through a PBX telephone system.

29. A method for managing at least one telephone line having a local end at which telephone calls are placed, comprising the steps of:
  generating at least one local end usage signal that corresponds to a total amount of telephone line usage measured at said local end of said telephone line during a given time period;
  comparing said at least one local end signal against at least one remote usage signal that corresponds to a total amount of telephone line usage measured remote from said local end of said telephone line during said given time period;
  generating at least one comparison signal corresponding to a result of said comparison, whereby said result is available through said comparison signal to direct a management function related to said telephone line.

30. A method as set forth in claim 29, further comprising the step of generating at least one individual call signal for each telephone call placed from said local end of said telephone line, said at least one individual call signal corresponding to an amount of line usage for said telephone call as measured at said local end of said telephone line, and said individual call signal being used to generate said at least one local end usage signal.

31. A method as set forth in claim 29, wherein said at least one local end usage signal and said at least one comparison signal are generated at said local end of said telephone line.

32. A method as set forth in claim 31, further comprising the step of displaying at said local end of said telephone line a visual indication of said result of said comparison as determined with reference to said comparison signal.

33. A method as set forth in claim 31, wherein said at least one remote usage signal is received from said telephone line at said local end of said telephone line.

34. A method as set forth in claim 29, wherein said at least one local end usage signal is generated at said local end of said telephone line and said at least one comparison signal is generated at a location remote from said local end of said telephone line, and wherein said at least one local end usage signal is transmitted over said telephone line from said local end of said telephone line to said remote location.

35. A method as set forth in claim 34, wherein said at least one local end usage signal is generated by a telephone set coupled with said telephone line at said local end of said telephone line.

36. A method as set forth in claim 35, further comprising the step of displaying at said local end of said telephone line a visual indication of said result of said comparison as determined with reference to said comparison signal.

37. A method as set forth in claim 29, wherein each of a plurality of local end usage signals corresponds to a total amount of direct-dial telephone line usage attributable to a particular service carrier.

38. A method as set forth in claim 29, wherein said telephone calls are direct-dialed telephone calls placed through a coin-operated telephone system.

39. A method as set forth in claim 29, wherein said telephone calls are placed through a PBX telephone system.

40. A method as set forth in claim 29, further comprising the step of directing a management function related to said telephone line.

41. A method as set forth in claim 40, wherein said management function is a pay and challenge procedure for handling received line charges.

* * * * *